(12) United States Patent
Wolff et al.

(10) Patent No.: US 7,406,184 B2
(45) Date of Patent: Jul. 29, 2008

(54) METHOD AND APPARATUS FOR USING THERMAL INFRARED FOR FACE RECOGNITION

(75) Inventors: Lawrence B. Wolff, New York, NY (US); Diego A. Socolinsky, Baltimore, MD (US); Christopher K. Eveland, Baltimore, MD (US); Andrea Selinger, Princeton, NJ (US); Joshua D. Neuheisel, Hampstead, MD (US)

(73) Assignee: Equinox Corporation, New York, NY (US)

( * ) Notice: Subject to any disclaimer, the term of this patent is extended or adjusted under 35 U.S.C. 154(b) by 868 days.

(21) Appl. No.: 10/611,859

(22) Filed: Jul. 3, 2003

(65) Prior Publication Data

US 2004/0005086 A1    Jan. 8, 2004

Related U.S. Application Data

(60) Provisional application No. 60/393,118, filed on Jul. 3, 2002.

(51) Int. Cl.
*G06K 9/00* (2006.01)

(52) U.S. Cl. .................. 382/118; 382/128; 382/115

(58) Field of Classification Search ......... 382/115–118, 382/209, 218, 181, 284, 128–134
See application file for complete search history.

(56) References Cited

U.S. PATENT DOCUMENTS

| 5,028,138 | A | | 7/1991 | Wolff |
| 5,471,240 | A | * | 11/1995 | Prager et al. ............ 348/164 |
| 5,555,324 | A | * | 9/1996 | Waxman et al. ............ 382/254 |
| 5,557,324 | A | | 9/1996 | Wolff |
| 5,726,755 | A | | 3/1998 | Wolff |
| 5,781,336 | A | | 7/1998 | Coon et al. |
| 5,808,350 | A | | 9/1998 | Jack et al. |
| 6,020,994 | A | | 2/2000 | Cook |
| 6,046,811 | A | | 4/2000 | Wolff et al. |
| 6,173,068 | B1 | * | 1/2001 | Prokoski .................. 382/115 |
| 6,208,459 | B1 | | 3/2001 | Coon et al. |
| RE37,752 | E | | 6/2002 | Wolff |
| 6,539,126 | B1 | | 3/2003 | Socolinsky et al. |
| 6,781,127 | B1 | * | 8/2004 | Wolff et al. ............... 250/332 |
| 2004/0005086 | A1 | | 1/2004 | Wolff et al. |
| 2006/0133571 | A1 | * | 6/2006 | Winsor ................... 378/98.8 |

OTHER PUBLICATIONS

"Analyzing PCA-based Face Recognition Algorithms: Eigenvector Selection and Distance Measures," Wendy S. Yambor, Bruce A. Draper, J. Ross Beveridge; Computer Science Dept., Colorado State Univ., Jul. 1, 2000.

(Continued)

*Primary Examiner*—Matthew C. Bella
*Assistant Examiner*—Wesley Tucker
(74) *Attorney, Agent, or Firm*—Jones, Tullar & Cooper, P.C.

(57) ABSTRACT

A methodology and apparatus is described that incorporates the use of thermal infrared imaging into a complete end-to-end face recognition system. Since thermal infrared primarily images emissive phenomenology there are advantages over video imaging in the reflective domain (e.g., visible, near-infrared) for face recognition, particularly with respect to image invariance in the presence of varying illumination incident on the subject. On the other hand video cameras in the reflective domain provide important image detail not apparent in thermal infrared imagery. Fusion of thermal infrared imagery with reflective domain (e.g., visible, near-infrared) imagery provides even further advantages. Embodiments of such systems that incorporate thermal infrared imaging for automatic face recognition are important for access control, verification, identification, and surveillance and monitoring.

13 Claims, 10 Drawing Sheets

OTHER PUBLICATIONS

"Independent component analysis, A new concept?", Pierre Comon; Elsevier Science B.V., 1994.

"Combination of Classifiers on the Decision Level for Face Recognition," Bernard Achermann and Horst Bunke; Insitut fur Informatik und angewandte Mathematik, Universitat Bern, Jan. 1996.

"Recognizing Imprecisely Localized, Partially Occluded, and Expression Variant Faces from a Single Sample per Class," Aleix M. Martinez; IEEE, 2002.

"Multi-Modal Person Authentication," J. Bigun, B. Duc, F. Smeraldi, S. Fischer, and A. Makarov; Nato Advanced Study Institute (ASI) Programme, Stirling, UK, Jun. 23-Jul. 4, 1997.

"Local Feature Analysis: A general statistical theory for object representation," Penio S Penev and Joseph J Atick; Computational Neuroscience Laboratory, Oct. 9, 1996.

"Comparative Assessment of Independent Component Analysis (ICA) for Face Recognition," Chengjun Liu and Harry Wechsler; Second Int'l Conf. on Audio- and Video-based Biometric Person Authentication, Mar. 1999.

"Eigenfaces vs. Fisherfaces: Recognition Using Class Specific Linear Projection," Peter N. Belhumeur, Joao P. Hespanha, and David J. Kriegman; IEEE Transactions on Pattern Analysis and Machine Intelligence, vol. 19, No. 7, Jul. 1997.

"Efficient Evaluation of Classification and Recognition Systems," Ross J. Micheals, Terrance E. Boult; Proceedings of 2001 IEEE computer Society Conf. on Comp. Vision and Pattern Recognition, 2001.

"An information-maximisation approach to blind separation and blind deconvolution," Anthony J. Bell and Terrence J. Sejnowski; Computational Neurobiology Laboratory; Neural Computation, 1995.

"Quantitative Measurement of Illumination Invariance for Face Recognition Using Thermal Infrared Imagery," Lawrence B. Wolff, Diego A. Socolinsky, Christopher K. Eveland; Equinox Corp.

"Illumination Invariant Face Recognition Using Thermal Infrared Imagery," Diego A. Socolinsky, Lawrence B. Wolff, Joshua D. Neuheisel, Christopher K. Eveland; Equinox Corp.

"History, Current Status, and Future of Infrared Identification," Francine Prokoski, Ph.D.; IEEE 2000.

"Comparison of Visible and Infra-Red Imagery for Face Recognition," Joseph Wilder, P. Jonathon Phillips, Cunhong Jiang, Stephen Wiener; IEEE 1996.

"A Comparative Analysis of Face Recognition Performance with Visible and Thermal Infrared Imagery," Diego Socolinsky, Andrea Selinger; Equinox Corp.

"Tracking Human Faces in Infrared Video," Christopher K. Eveland, Diego A. Socolinsky, Lawrence B. Wolff; Equinox Corp.

"Face Recognition: The Problem of Compensating for Changes in Illumination Direction," Yael Adini, Yael Moses, and Shimon Ullman; IEEE 1997.

"Eigenfaces for Recognition," Matthew Turk and Alex Pentland; Jrnl. of Cognitive Neuroscience, vol. 3, No. 1, MIT 1991.

"Extending Color Vision Methods to Bands Beyond the Visible ," D. Scribner, P. Warren and J. Schuler; Naval Research Lab., Code 5636, Washington, D.C. 20375.

"Fused Reflected/Emitted Light Sensors," S. Horn, J. Campbell, R. Driggers, T. Soyka, P. Norton, P. Perconti; Infrared Tech. and Applications XXVII, Proceedings of SPIE vol. 4369 (2001).

"Integrated Imaging Sensors," J. Anderson, T. Kostrzewa, L. Cook, G. Baker, et al.; Infrared Technology and Applications XXVII, Proceedings of SPIE vol. 4369 (2001).

"Multi-Sensor Image Fusion," Y.T. Zhou, HNC Software, Inc., San Diego, CA., 1994 IEEE.

"Multiscale contrast enhancement with applications to image fusion," Alexander Toet; Optical Engineering, May 1992, vol. 31, No. 5.

"New false color mapping for image fusion," Alexander Toet, Jan Walraven; Opt. Eng. 35(3) 650-658 (Mar. 1996).

"Color Night Vision: Opponent Processing in the Fusion of Visible and IR Imagery," A. M. Waxman, A.N. Gove, D.A. Fay, J. P. Racamato, J. E. Carrick, M.C. Seibert and E.D. Savoye; Neural Networks Letter1996.

"Merging Thermal and visual images by a constrast pyramid," A Toet, L. J. van Ruyven, J. M. Valeton; Optical Eng., Jul. 1989, vol. 28, No. 7.

"Infrared Color Vision: An Approach to Sensor Fusion," D. Scribner, P. Warren, J. Schuler, M. Satyshur, and M. Kruer; Optics & Photonics News, Aug. 1998.

"Multi-Sensor Image Fusion Using the Wavelet Transform," H. Li, B.S. Manjunath and S. K. Mitra; 1994 IEEE.

"Digital Picture Processing, Second Edition, vol. 1," A Rosenfeld, A.C. Kak, Academic Press, 1982.

"On Information Extraction Principles for Hyperspectral Data," D. Landgrebe, School of Electrical & Comp. Eng., Purdue U., 1997.

"Theory and Analysis of Color Discrimination for the Computation of Color Edges Using Camera Sensors in Machine Vision," L. B. Wolff and D. A. Socolinsky.

"A Comprehensive Introduction to Differential Geometry," vol. Two, Second Ed., Michael Spivak, PUblish or Perish, Inc., 1975, 1979.

"Numerical Recipes in C, The Art of Scientific Computing," W.H. Press, B. P. Flannery, S. A. Teukolsky, W.T. Vetterling; Cambridge Univ. Press, 1988, 1989, 1990.

"Remote SEnsing and Image Interpretation," Third Edition, T. M. Lillesand, R. W. Kiefer; John Wiley & Sons, 1979, 1987, 1994.

"Digital Step Edges from Zero Crossing of Second Directional Derivatives," R. M. Haralick.

"Edge Detection in Multispectral Images," Aldo Cumani; 1991, Academic Press, Inc., CVGIP: Graphical Models and Image Proc., vol. 53, No. 1, Jan., pp. 40-51.

"Perceptual-Based Image Fusion for Hyperspectral Data," T.A. Wilson, S.K. Rogers, M. Krabrisky; IEEE Transactions on Geoscience and Remote Sensing, Vo. 35, No. 4, Jul. 1997.

"Multispectral Image Visualization through First Order Fusion," D.A. Scoloinsky, L. B. Wolff; Oct. 26, 1999.

"Multisensor Image fusion techniques in remote sensing," M. Ehlers; ISPRS Jrnl. of Photogrammetry and Remote Sensing, 46 (1991).

"Multispectral Image Visualization using Local Self-Organizing Maps," P. Scheunders.

"Data Fusion Techniques for Remotely Sensed Images," A. Chiuderi and S. Fini; 1994 Elsevier Science B.V.

"The Utility of Principal Component Analysis for the Image Display of Brain Lesions. A Preliminary, Comparative Study," Udo Schmiedl, D. A. Ortendahl, A.S. Mark, I. Berry and L. Kaufman; 1987 Academic Press, Magnetic Resonance in Medicine 4, 471-486.

"Multispectral Image Visualization with Nonlinear Projections," A. Manduca; 1996, IEEE, IEEE Transactions on Image Processing, vol. 5, No. 10, Oct. 1996.

"Feature Extraction Techniques for Exploratory Visualization of Vector-Valued Imagery," G. Harikumar and Y. Bresler; IEEE, IEEE Transactions on Image Processing, vol. 5, No. 9, Sep. 1996.

* cited by examiner

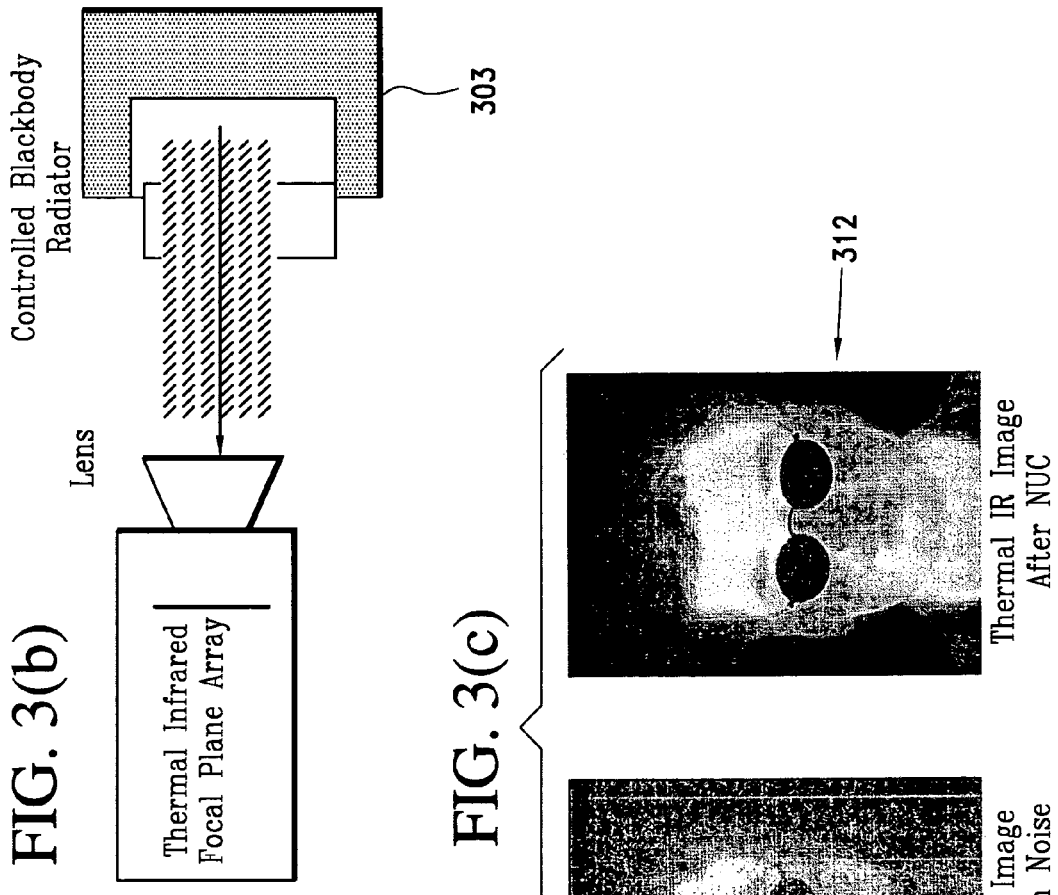
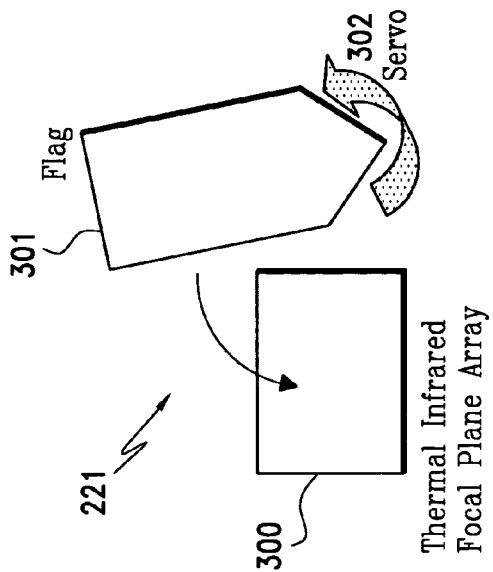
FIG. 3(b)
FIG. 3(c)
FIG. 3(a)

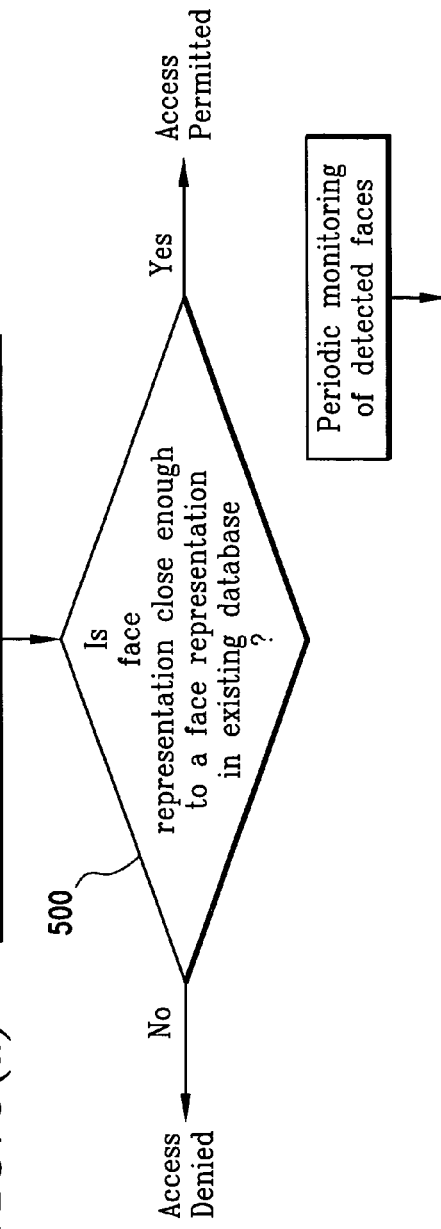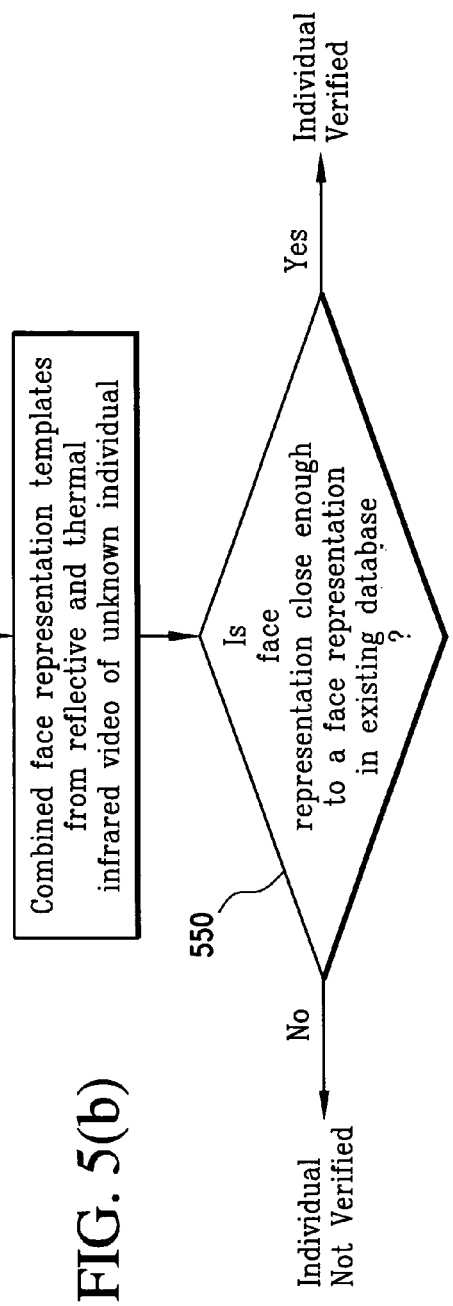
FIG. 5(a)
FIG. 5(b)

METHOD AND APPARATUS FOR USING THERMAL INFRARED FOR FACE RECOGNITION

FIELD OF THE INVENTION

This application claims the benefit of U.S. Provisional Application No. 60/393,118, filed Jul. 3, 2002, the disclosure of which is hereby incorporated herein by reference.

The invention described herein relates to the use of thermal infrared imaging for face recognition.

BACKGROUND OF THE INVENTION

Over the past several years the development of face recognition systems has been receiving increased attention as having the potential for providing a non-invasive way of improving security systems and homeland defense. Such systems may be used for applications such as access control to restricted areas, by either control of physical entry into a building, room, vault or an outdoor area or electronically such as to a computer system or ATM. Another application of such systems is identification of individuals on a known watchlist, which can consist of but is not limited to, known criminals, terrorists, or casino cardcounters. For identification a face recognition system produces a rank ordering of known individuals that closely match an unknown subject. If there is an identification matched ranking of N (e.g., N=10) or less with a known malevolent individual, then the unknown subject can either be detained or taken to a secondary procedure where further information is solicited. Another set of applications include surveillance and monitoring of scenes whereby the identity of individuals present in a scene is periodically verified.

Existing end-to-end systems that detect and recognize faces of individuals at a distance are exclusively performed with visible light video cameras. The influence of varying ambient illumination on systems using visible imagery is well-known to be one of the major limiting factors for recognition performance [Wilder, Joseph and Phillips, P. Jonathon and Jiang, Cunhong and Wiener, Stephen, "Comparison of Visible and Infra-Red Imagery for Face Recognition," Proceedings of 2nd International Conference on Automatic Face & Gesture Recognition, pp. 182-187, Killington, Vt., 1996; Adini, Yael and Moses, Yael and Ullman, Shimon, "Face Recognition: The Problem of Compensating for Changes in Illumination Direction," IEEE Transactions on Pattern Analysis and Machine Intelligence, Volume 19, No. 7, pp. 721-732, July, 1997]. A variety of methods compensating for variations in illumination have been studied in order to boost recognition performance, including histogram equalization, Laplacian transforms, Gabor transforms, logarithmic transforms, and 3-D shape-based methods. These techniques aim at reducing the within-class variability introduced by changes in illumination, which has been shown to be often larger than the between-class variability in the data, thus severely affecting classification performance. System performance, particularly outdoors where illumination is dynamic, is problematic with existing systems.

Face recognition in the thermal infrared domain has received relatively little attention compared with recognition systems using visible-spectrum imagery. Original tentative analyses have focused mostly on validating the thermal imagery of faces as a valid biometric [Prokoski, F. J., "History, Current Status, and Future of Infrared Identification, Proceedings IEEE Workshop on Computer Vision Beyond the Visible Spectrum: Methods and Applications, Hilton Head, June, 2000; Wilder, Joseph and Phillips, P. Jonathon and Jiang, Cunhong and Wiener, Stephen, "Comparison of Visible and Infra-Red Imagery for Face Recognition," Proceedings of 2nd International Conference on Automatic Face & Gesture Recognition, pp. 182-187, Killington, Vt., 1996]. The lower interest level in infrared imagery has been based in part on the following factors: much higher cost of thermal sensors versus visible video equipment, lower image resolution, higher image noise, and lack of widely available data sets. These historical objections are becoming less relevant as infrared imaging technology advances, making it attractive to consider thermal sensors in the context of face recognition.

SUMMARY OF THE INVENTION

Thermal infrared imagery of faces is nearly invariant to changes in ambient illumination [Wolff, L. and Socolinsky, D. and Eveland, C., "Quantitative Measurement of Illumination Invariance for Face Recognition Using Thermal Infrared Imagery, Proceedings CVBVS, Kauai, December, 2001]. Consequently, no compensation is necessary, and within-class variability is significantly lower than that observed in visible imagery [Wolff, L. and Socolinsky, D. and Eveland, C., Quantitative Measurement of Illumination Invariance for Face Recognition Using Thermal Infrared Imagery," Proceedings CVBVS, Kauai, December, 2001]. It is well-known that for visible video the set of images of a given face acquired under all possible illumination conditions is a subspace of the vector space of images of fixed dimensions. In sharp contrast to this, the set of thermal infrared images of a face under all possible imaging conditions is contained in a bounded set. It follows that under general conditions lower within-class variation can be expected for thermal infrared images of faces than their visible counterpart. It remains to be demonstrated that there is sufficient between-class variability to ensure high discrimination, but the combined use of both reflective spectrum and thermal infrared imagery provides even more accurate discrimination [Socolinsky, D., Wolff, L., Neuheisel, J., and Eveland, C. "Illumination Invariant Face Recognition Using Thermal Infrared Imagery," Computer Vision and Pattern Recognition, Kauai, December, 2001 & Socolinsky, D. and Selinger A., "A Comparative Analysis of Face Recognition Performance with Visible and Thermal Infrared Imagery," ICPR '02, Quebec, August, 2002].

A key aspect of a face recognition system is to be able to store and match representation templates of faces. Creating face representation templates from both reflective spectrum and thermal infrared imagery provides significant advantages. In the present invention both video imagery sensed in a sub-spectrum of the reflective domain and video imagery sensed in a sub-spectrum of the thermal infrared domain are used to detect a face, create a face representation template, and match/compare the face representation template of an unknown individual with a stored database or gallery of face templates. This can be applied to a variety of uses for face recognition systems. Reflective domain and thermal infrared domain imagery have a low degree of correlation with respect to the phenomenological information that they sense from a scene. This makes such imaging modalities highly complementary in the additional information they provide each other, which is particularly useful for face recognition systems.

This invention also includes sensor technology that acquires both reflective spectrum (e.g., visible) imagery and thermal infrared imagery. This can either consist of separate visible and thermal infrared sensors or integrated visible/thermal infrared sensors. Cameras that use CCD, CMOS and CID focal plane arrays (FPA) have sensitivity typically in the 0.4-1.0 micron wavelength range spanning the visible and near-infrared spectrums. The InGaAs FPA made by Sensors Unlimited has a sensitivity range typically 0.9-1.7 microns. Cooled InSb FPA has good sensitivity in the 3-5 micron thermal infrared range, while cooled MCT or QWIP FPA, and uncooled microbolometer FPA, have good sensitivity in the 8-12 micron range. It is important to apply proper non-uniformity correction (NUC) and radiometric calibration procedures to thermal infrared imagery.

BRIEF DESCRIPTION OF THE DRAWINGS

FIG. 3(a) illustrates a method for non-uniformity correction (NUC) of thermal infrared imagery using a constant temperature flag; (b) illustrates NUC or radiometric calibration of thermal infrared imagery using a blackbody source; and FIG. 3(c) illustrates an example of how pattern noise is removed from a thermal infrared image;

FIG. 5(a) is a flow chart of a face representation template for access control; and FIG. 5(b) is a flow chart of a face representation template for verifying identity of individuals being periodically monitored;

DESCRIPTION OF THE INVENTION AND PREFERRED EMBODIMENTS

Figure 1:
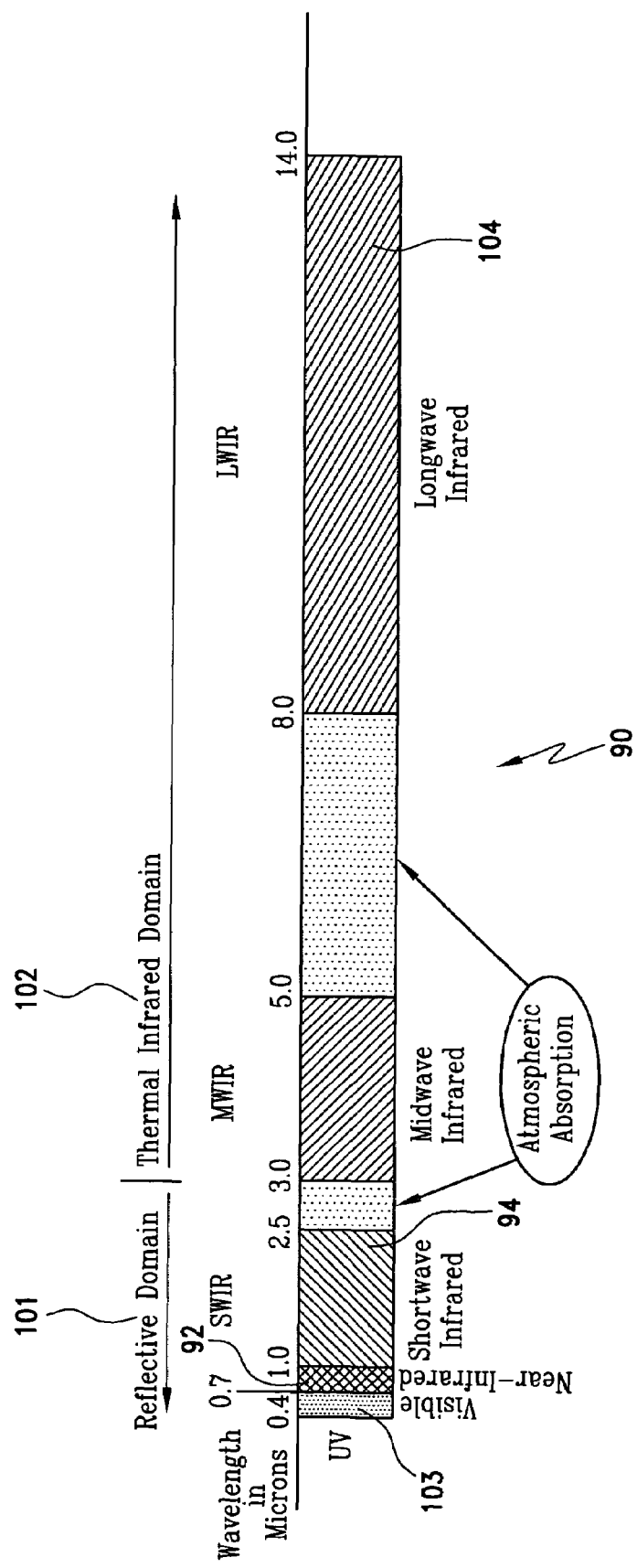
FIG. 1 is a taxonomy of important regions of the electromagnetic spectrum, defining the Reflective and Thermal Infrared domains (spectrums) discussed herein.

It should be noted that the term infrared as used in the literature does not always refer to thermal infrared, and in fact as shown in FIG. 1 by the spectrum 90 there are important imaging sub-spectrums of the infrared spectrum that primarily record reflective phenonmenology, such as the near-infrared 92 and the shortwave infrared 94 (SWIR). Image fusion described herein refers to fusion of images taken from a sub-spectrum of the reflective domain 101, and a sub-spectrum of the thermally emissive (i.e., thermal infrared) domain 102 as specified in FIG. 1.

Figure 2:
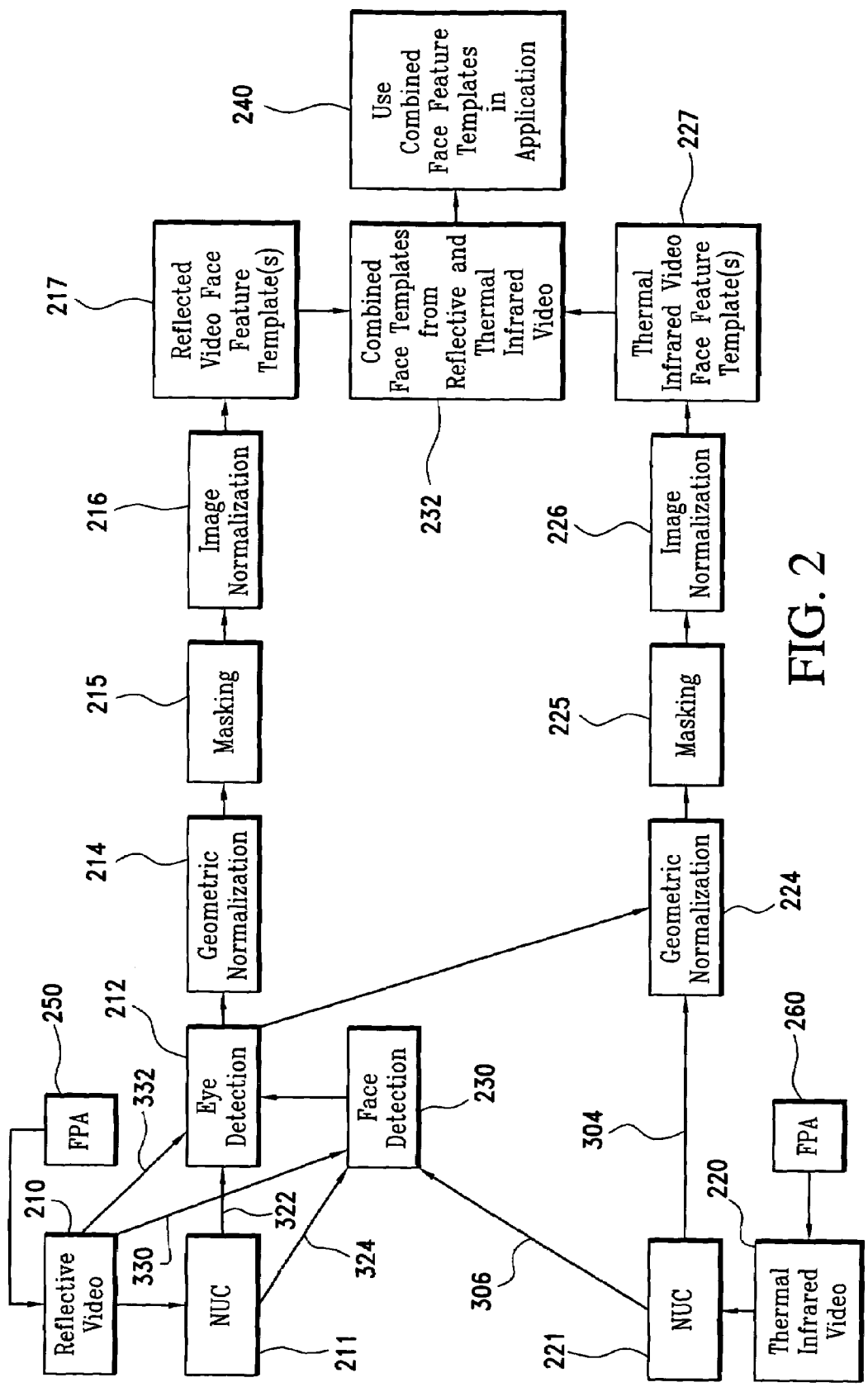
FIG. 2 is a block diagram illustrating thermal infrared video imaging in conjunction with reflected video imaging for creating a face recognition representation template for use in an end-to-end system.

FIG. 2 illustrates a face recognition system 200 receiving two video imaging streams 210 and 220 from suitable sensors or cameras 250 and 260, respectively. One of the video imaging streams 210 is produced from sensing in the reflective domain 101, while the other video imaging stream 220 is produced from sensing in the thermal infrared domain 102. In a preferred embodiment, the reflective video stream 210 is in the visible spectrum 103 and is produced from a CCD focal plane array (FPA) in camera 250, while the thermal infrared video stream 220 is in the LWIR spectrum 104 and is produced from a microbolometer focal plane array (FPA) in camera 260. Although two cameras are illustrated, it will be understood that the respective FPAs may be in a single camera. In a preferred embodiment, image pixels produced from the reflective video imaging stream are spatially co-registered with image pixels produced from the thermal infrared video stream. Typically there is more spatial resolution available from sensing in the reflective domain than there is available from sensing in the thermal infrared domain. In a preferred embodiment, multiple pixels from the reflective domain are assigned/co-registered to a single pixel in the thermal infrared domain.

Imagery produced from most thermal infrared focal plane arrays, as illustrated at 310 in FIG. 3(c), experience a significant amount of pattern noise with variable gain and offset for different pixels across the focal plane. Non-uniformity correction (NUC) image pre-processing, illustrated at 221 in FIG. 2, is used to clarify the image as illustrated at 204, and is required for thermal infrared imagery prior to use for face detection and further creation of a face representation template. FIGS. 3(a) and (b) show apparatus that can be used to perform this. FIG. 3(a) shows a common apparatus for performing a one-point NUC using a thermally opaque flag 301, usually made of metal which is at a constant temperature throughout, that periodically slides in front of the thermal infrared focal plane array (FPA) 300, which may be in camera 260, actuated by a servo or solenoid mechanism 302. Image processing insures that image gray values outputted at 304 or 306 (FIG. 2) by the thermal infrared FPA are exactly equal for all pixels across the focal plane when receiving equivalent thermal emission from a scene element as from the flag when calibration took place. This is also called a one-point NUC. The gray value response of a thermal infrared camera is linear with respect to the amount of incident thermal radiation. The slope of the responsivity line is called the gain and the y-intercept is the offset. As mentioned, gain and offset for each pixel on a thermal infrared FPA vary significantly across the array. A one-point NUC insures that all responsivity lines respective to all pixels intersect at the thermal emission value for the flag.

A one-point NUC can also be achieved by using a blackbody source (e.g., a Mikron model 350), illustrated at 303 in FIG. 3(b), which not only has exactly uniform thermal emission spatially across a flat black surface, but the temperature of this flat black surface can be accurately controlled. Two separate thermal infrared images taken respectively for blackbody temperatures T1 and T2 produces a two-point NUC which establishes the direct linear relationship between the gray value response at a pixel and the absolute amount of thermal emission from the corresponding scene element. That is the gain and offset are precisely known for each pixel. A NUC such as element 221 in FIG. 2, can either refer to one-point or two-point procedure.

In the reflective domain, for InGaAs FPAs sensitive to SWIR radiation there is also a necessity to perform at least a one-point NUC 211 producing outputs 322 and 324. Other reflective domain FPAs, particularly scientific grade FPAs, may also require a one-point NUC. Typically, this is performed using the flag apparatus 301 shown in FIG. 3(a), such as for the Indigo Merlin InGaAs camera. However, for most CCD and CMOS FPAs, NUC is not an issue and 211 can be bypassed, as illustrated by lead lines 330 and 332.

While a two-point NUC in the thermal infrared provides non-uniformity correction, the relationship back to a physical property of the imaged object—its emissivity and temperature—provides the further advantage of data where environmental factors contribute to a much lesser degree to within-class variability. An added bonus of using a two-point NUC for thermal infrared is that it simplifies the problem of skin detection in cluttered scenes [Eveland, C., Socolinsky, D., and Wolff, L. "Tracking Human Faces in Infrared Video," CVPR Workshop on Computer Vision Beyond the Visible Spectrum, Kauai, December 2001]. The range of human body temperature is quite small, varying from 36 deg. C. to 38 deg. C. We have found that skin temperature at 22 deg. C. ambient room temperature to also have a small variable range from about 26 deg. C. to 29 deg. C. Two-point NUC makes it possible to perform an initial segmentation of skin pixels in the correct temperature range.

One can achieve marginally higher precision by taking blackbody measurements at multiple temperatures and obtaining the gains and offsets by least squares regression. For the case of thermal images of human faces, each of the two fixed temperatures are below and above skin temperature, respectively, to obtain the highest quality calibration for skin levels of thermal emission.

It should be noted that calibration has a limited life span. If a NUC is performed on a thermal infrared camera indoors, taking it outdoors where there is a significant ambient temperature difference will cause the offsets of individual pixels to change. Therefore, a NUC must be performed again. This effect is due mostly to temperature, variations of the lens optics and FPA. Also, if two separate data collections (i.e., a set of image acquisitions of individuals) are performed with different thermal infrared cameras, even with the exact same model number, identical camera settings and under the exact same environmental conditions, the gain and offset of corresponding pixels between these sensors will differ since no two thermal infrared focal plane arrays are ever identical. Yet another example: if two data collections are performed one year apart, with the same thermal infrared camera, it is very likely that gain and offset characteristics will have changed. Two-point NUC standardizes all thermal infrared data collections, whether they are taken under different environmental conditions or with different cameras or at different times. Since pixelwise gray values for a thermal infrared image are directly related to the thermal emission power of the imaged scene, this provides a standardized thermal IR biometric signature for humans. The most beneficial images for face recognition algorithms are not arrays of gray values, but rather of corresponding thermal emission values. This is one critical difference between thermal and visible imaging for face recognition: the inability to relate visible intensities to intrinsic properties of the object makes it impossible to use absolute gray values as a reliable recognition feature.

Figure 4:
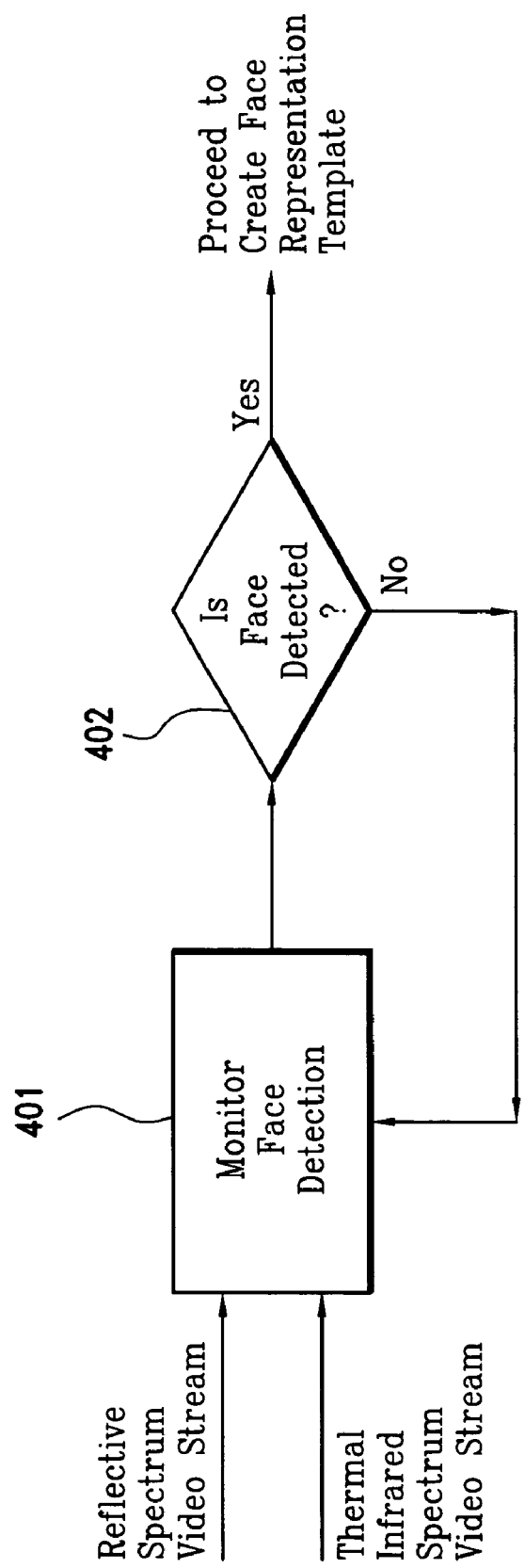
FIG. 4 is a flow chart of a face detection monitoring loop

In order to initiate the face recognition system of the present invention for any application, a face must be detected in the scene. In accordance with the method of the present invention (FIG. 4), a scene is continuously monitored, at 401, until a face is detected, at 402. When a face is detected by detector 230 (FIG. 2), eyes for the face are then detected at detector 212 and this detector output is used for geometric normalization of the reflective video image as indicated at 214. Similarly, the thermal infrared video image is geometrically normalized at 224. For geometric normalization at 214 and 224, the locations of the eyes are used to affinely map the images to a standard geometry, with fixed eye locations. These images are then sub-sampled and subsequently cropped with corresponding masks 215 and 225 that remove all but the inner face, thus eliminating the effect of background, hair, etc. After masking image normalization is performed at 216 and 226, that statistically demeans and Gaussian normalizes the gray values of the masked image.

Figure 6:
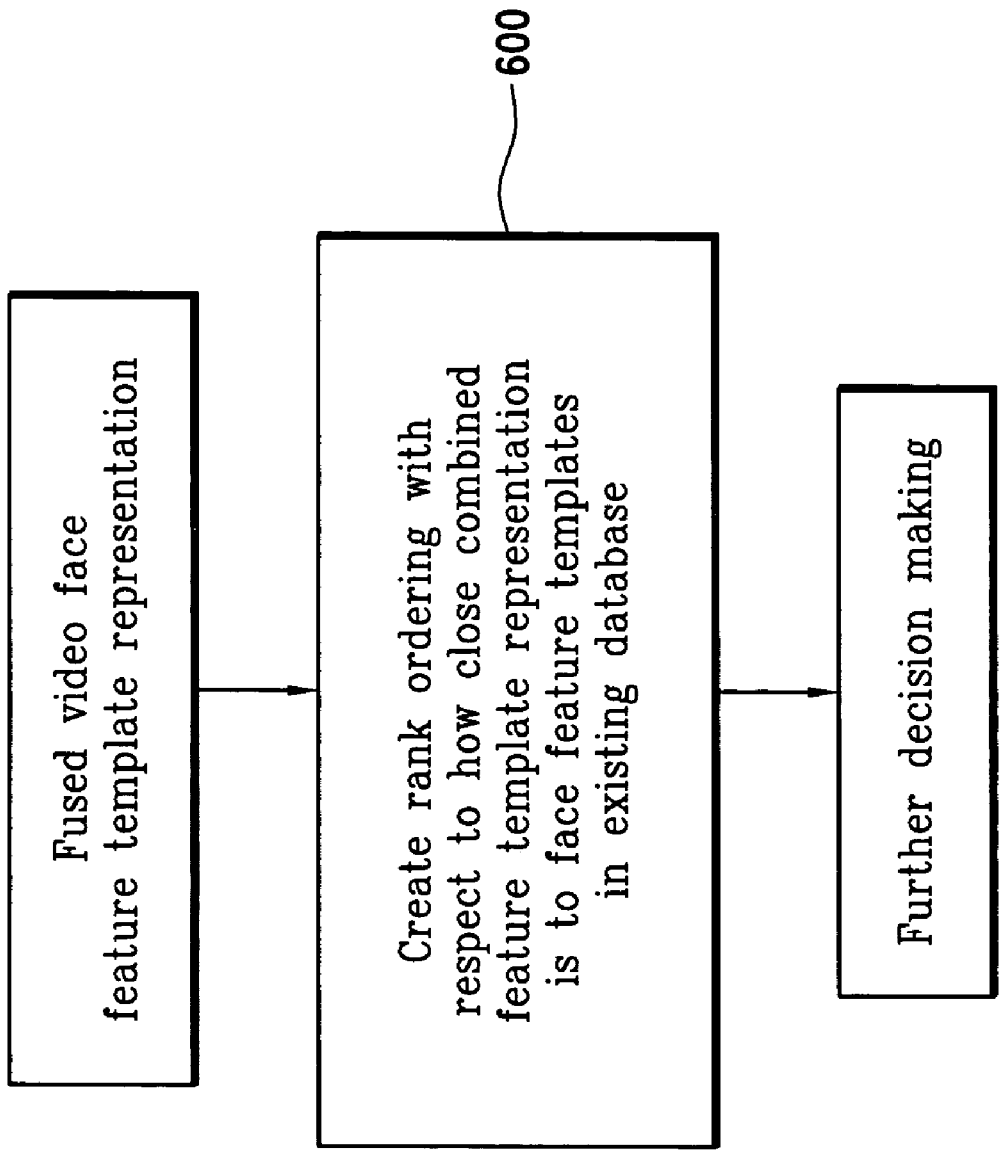
FIG. 6 is a flow chart of a face representation template for identification.

Many face recognition (and general pattern classification) algorithms can be divided into two stages: first, a feature representation such as that carried out at 217, 227, and 232 in FIG. 2 and resulting from an image input, or probe, and second, a similarity computation illustrated at 240 in FIG. 2 and carried out using the steps 500, 550, 600 illustrated in FIGS. 5(a), 5(b), and 6 to match the probe image with a gallery of images in a database. The feature representation stage is responsible for encoding the stimulus to be classified in the form of a sequence of numbers, or a feature vector. This vector is usually of fixed length, and the mapping process from stimuli to feature vectors is fixed when a system is initiated. Once both probes (unknown faces) and gallery (know faces) data have been mapped to the feature vector space, classification proceeds by considering the similarity between the probe and each gallery exemplar. This similarity can be computed with respect to multiple measures, yielding different performance characteristics. It is often the case that a feature representation is constructed to be optimal for a specific similarity measure. However, it is possible that a different similarity measure yields better classification performance when paired with that feature representation.

For normalization elements 216 and 226, preprocessed face images respectively in the reflective spectrum and in the thermal infrared spectrum, in the form of n-tuples, are mapped into a k-dimensional feature space (where $1 \leq k < \infty$) via a linear, affine or fully non-linear map. These k-tuples are known as templates. The preferred embodiment of step 240 incorporates a nearest-neighbor classification with respect to a norm on $R^k$. Alternative embodiments can incorporate neural networks or support vector machines (SVM) or other classifiers. There are various existing methods for generating templates; for example Turk, M. and Pentland, A., "Eigenfaces for Recognition," J. Cognitive Neuroscience, Volume 3, Pages 71-86, 1991; Belhumeur, P. and Hespanha, J. and Kriegman, D., "Eigenfaces vs. Fisherfaces: Recognition Using Class Specific Linear Projection," IEEE Transactions PAMI, Volume 19, No. 7, Pages 711-720, July, 1997; Penev, P. and Attick, J., "Local Feature Analysis: A general statistical theory for object representation, Network: Computation in Neural Systems," Volume 7, No. 3, Pages 477-500, 1996; R. J. Michaels and T. Boult, "Efficient evaluation of classification and recognition systems," Proceedings of IEEE Computer Vision and Pattern Recognition, Kauai, Hi., December, 2001; A. J. Bell and T. J. Sejnowski, "An Information-Maximization Approach to Blind Separation and Blind Deconvolution," Neural Computation Volume 7, Number 6, Pages 1129-1159, 1995; C. Liu and H. Wechsler, "Comparative Assesment of Independent Component Analysis (ICA) for Face Recognition," Proceedings of the Second Int. Conf. on Audio- and Video-based Biometric Person Authentication, Washington, D.C., March, 1999; P. Comon, "Independent component analysis: a new concept?," Signal Processing, Volume 36, Number 3, Pages 287-314, 1994, as well as others.

When step 240 is a nearest neighbor classifier, there are multiple choices as to the distance function used for classification (or dissimilarity). A dissimilarity measure is a function $\delta: R^k \times R^k \to R$ such that arg min $\delta(v, w) = v$, for all $v \in R^k$. Although this is not strictly necessary, it is customary to assume that $\delta$ is continuous in each variable. Multiple dissimilarity measures may be used.

A combination of classifiers can often perform better than any one of its individual component classifiers. In fact, there is a rich literature on the combination of classifiers for identity verification, mostly geared towards combining voice and fingerprint, or voice and face biometrics (e.g. J. Big'un and B. Due and F. Smeraldi and S. Fischer and A. Makarov, "Multi-Modal Person Authentication, Proceedings of Face Recognition: From Theory to Applications," Stirling, UK, NATO Advanced Study Institute, July, 1997; B. Achermann and H. Bunke, "Combination of Classifiers on the Decision Level for Face Recognition," Institute of Computer Science and Applied Mathematics, University of Bern, Number IAM-96-002, Bern, Switzerland, January, 1996). The degree to which combining the results of two or more classifiers improves performance is highly dependent on the degree of correlation among classifier decisions. Combining several highly correlated classifiers normally has no effect beyond that of increasing system complexity, whereas fusing experts with low correlation can dramatically improve performance. Some results and further considerations on fusing face recognition algorithms on visible imagery can be found in W. S. Yambor and B. A. Draper and J. R. Beveridge, "Analyzing PCA-based Face Recognition Algorithms: Eigenvector Selection and Distance Measures," Proceeding 2nd Workshop on Empirical Evaluation in Computer Vision, Dublin, Ireland, 2000. In the case of coregistered visible/thermal imagery, a perfect opportunity for classifier fusion is available, since from physical principles it is known that there is very low correlation between the data in the two modalities.

In a preferred embodiment of step 240 a weighted combination of normalized scores from each classifier corresponding to either full face or sub-windows from one or more of the reflective/thermal infrared imaging modalities is used. These scores could be distance or dissimilarity values in the case of nearest-neighbor classifiers, neuron activation strength in the case of neural networks, or distances to a separating hyperplane when used with SVM. The weights can be adaptably varied to account for relative classifier performance, image degradation, occlusion, expression variation, etc. Individual scores may be normalized to account for variability in statistical properties of scores output by different classifiers.

As one example, a simple adaptive weighting scheme is introduced that yields a single distance-like score from the dissimilarity score returned by two classifiers, each one acting on one modality from a visible/thermal pair. Let $G^v$ and $G^I$ be the visible and thermal infrared image galleries, respectively, and $p^v$ and $p^I$ be the visible and thermal infrared components of a bi-modal probe image. Lastly, let $\delta^v$ and $\delta^I$ be the dissimilarity measures on the respective feature vector spaces corresponding to the recognition algorithms used on each modality. For any feature vector $(g^v, g^I) \in G^v \times G^I$, a combined dissimilarity score is defined by:

$$\delta^f((p^v, p^I), (g^v, g^I)) = \frac{1}{3}\left[\frac{\delta^v(p^v, g^v)}{\overline{\omega}^v} + 2\frac{\delta^I(p^I, g^I)}{\overline{\omega}^I}\right] \quad \text{(Eq. 1)}$$

where $\overline{\omega}^v$ and $\overline{\omega}^I$ are the median values of the sets $\{\delta^v(p^v,G^v)\}$ and $\{\delta^v(p^v,G^v)\}$, respectively. The median factors dividing each term insure that dissimilarity scores on widely different scales can be combined without one overwhelming the other. A fused face score from reflective spectrum and thermal infrared spectrum imagery at 232 can be accordingly made, with associated classifiers to perform matching decisions 240, 500, 550 and 600. This is only an example and not a preferred embodiment.

Figure 7:
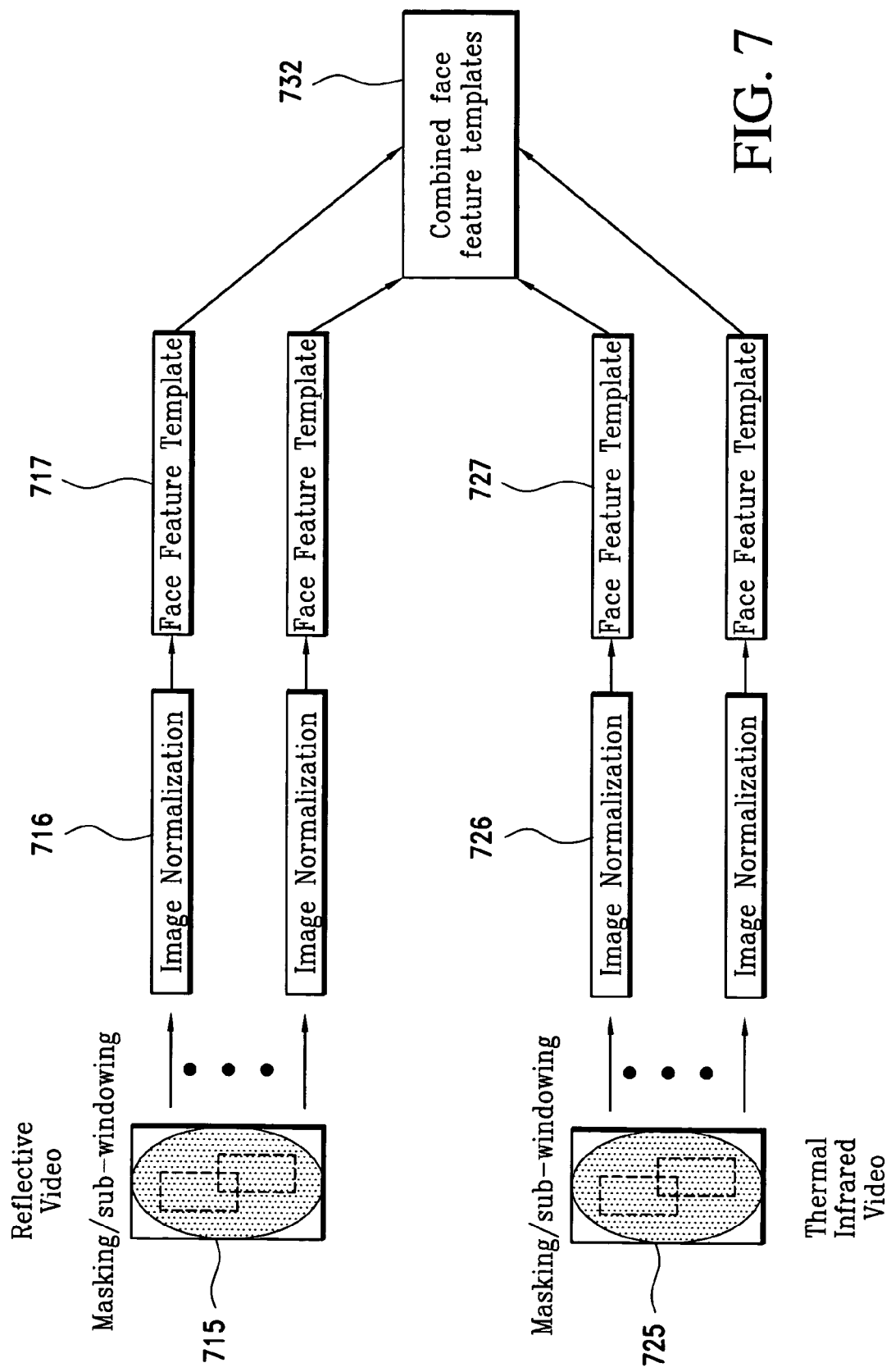
FIG. 7 is a block diagram showing creation of a face representation template from masked subregions of images from the reflective spectrum and from the thermal infrared spectrum.

FIG. 7 shows that fusion between reflective spectrum and thermal infrared imagery can go beyond just using the entire face image for each modality. Martinez, A.M., "Representing Imprecisely Localized, Partially Occluded, and Expression Invariant Faces from a Single Sample per Class," IEEE Transactions on PAMI, Vol. 24, No. 6, June, 2002 discusses a methodology by which multiple sub-windows/sub-regions of face images can each be reduced to a representation (i.e., template), and then these representations can be combined. This is particularly useful in the presence of temporary occlusions and variant face expressions. This methodology is extended, by the present invention, to fusion of reflective spectrum and thermal infrared imagery. When performing this method, steps 715, 716 and 717 correspond to steps 215, 216 and 217, respectively; and steps 725, 726 and 727 correspond to steps 225, 226 and 227, respectively. Each one of the face feature templates in 717 and 727 corresponds to a selected sub-window image region. The sub-windowing scheme for the reflective spectrum image need not be the same as the sub-windowing scheme for the thermal infrared image.

Figure 8:
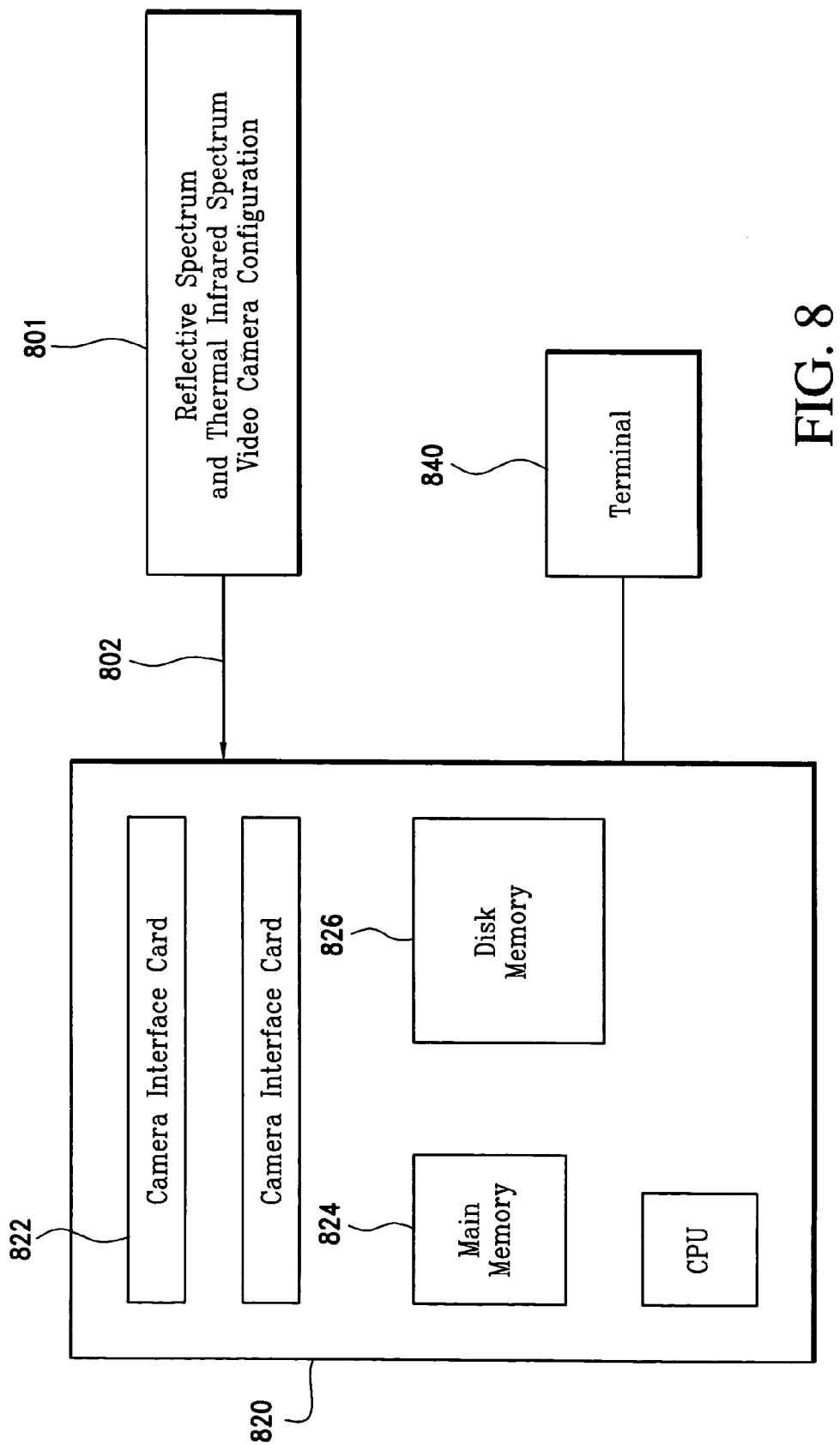
FIG. 8 is a block diagram showing hardware apparatus required to implement a system for creating face representation template from reflective and thermal infrared imagery.
Figure 9:
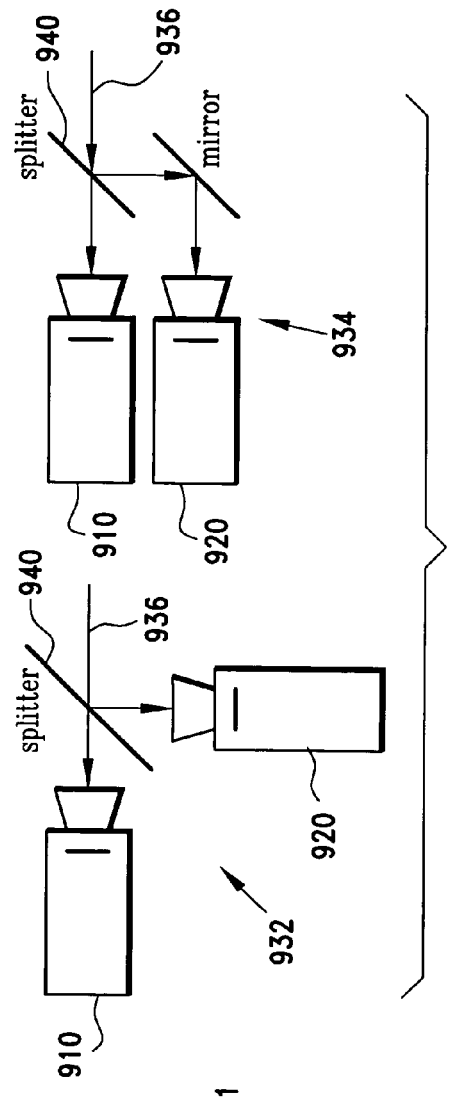
FIGS. 9(a) through 9(e) illustrate a number of configurations of reflective spectrum and thermal infrared spectrum imaging sensors at various levels of integration.

Hardware apparatus for implementing the methodology taught here as illustrated diagrammatically in FIG. 8, consists of a camera configuration 801 (or simply, camera) capable of simultaneously acquiring a reflective spectrum image and a thermal infrared spectrum image and able to output this imagery at 802 either in an analog or digital mode. FIG. 9 illustrates a number of specific camera configurations that can be used for determining camera 801. The camera 801 interfaces to a computer system 820 by connecting with an interface card 822 which could be a digital interface card if the camera output is digital or an analog/digital converter if the camera output is analog. Interface card 822 enables reflective spectrum and thermal infrared images to be placed in computer memory 824. This can be stored in disk memory 826. Creation of the face representation template and subsequent use of this template to compare and match with existing templates for face recognition applications is performed by software operating on computer system 820. ACE face recognition software, version 1.0 by Equinox, Inc., 9 West 57$^{th}$ Street, NY, N.Y., is one example of this. This software operating on computer 820 also performs the face detection process monitoring when a face is present in the scene of interest, and determines when to acquire imagery of unknown subjects, store imagery, create face representation templates, and perform matching comparisons for specified face recognition applications.

FIG. 9 illustrates a number of ways to configure a camera sensor that simultaneously acquires reflective spectrum and thermal infrared imagery. At the least, an FPA 910 that senses in the reflective spectrum (e.g., CCD 0.4-1.0 micron, InGaAs 0.9-1.7 micron), and an FPA 920 that senses in the thermal infrared (e.g., InSb 3.0-5.0 microns, MCT 8-12 microns, microbolometer 8-14 microns) are required. FIG. 9(a) shows two separate cameras with respectively separate electronics and separate optics. These two cameras are respectively viewing reflective domain radiation 911 and thermal infrared domain radiation 921 from the same elements of a scene, although from possibly different viewing directions. FIG. 9(b) shows a boresighted configuration 930 for the same respective cameras 910 and 920. In this configuration the optical axis for each camera lens is parallel, and viewing differences between the two cameras only exists with respect to the translational baseline segment determined by the optical centers for each camera. This produces some translational disparity between the respective image pixels for the reflective domain and thermal infrared domain FPAs.

FIG. 9(c) shows configurations 932 and 934 using the same two separate cameras 910 and 920 as in 9(a,b) but incorporating a dichroic beamsplitter 940 that takes radiation 936 from a scene and either transmits thermal infrared domain radiation and reflects reflected domain radiation, or vice versa. A dichroic beamsplitter used in this fashion further reduces the baseline displacement between the reflective domain and thermal infrared domain cameras.

FIG. 9(d) shows an integrated camera 944 having two FPAs 946 and 948, respectively, sensing in the reflective domain and in the thermal infrared domain. An important difference between 9(c) and 9(d) is that it includes a dichroic beamsplitter 942 completely behind all common focusing optics 950. This completely eliminates depth dependent disparity between the reflective domain and thermal infrared domain FPAs. FIG. 9(e) depicts a camera 958 with a hybrid FPA 960 capable of sensing both a subspectrum of reflective domain and thermal infrared radiation 964 with a focusing lens 962.

Figure 10:
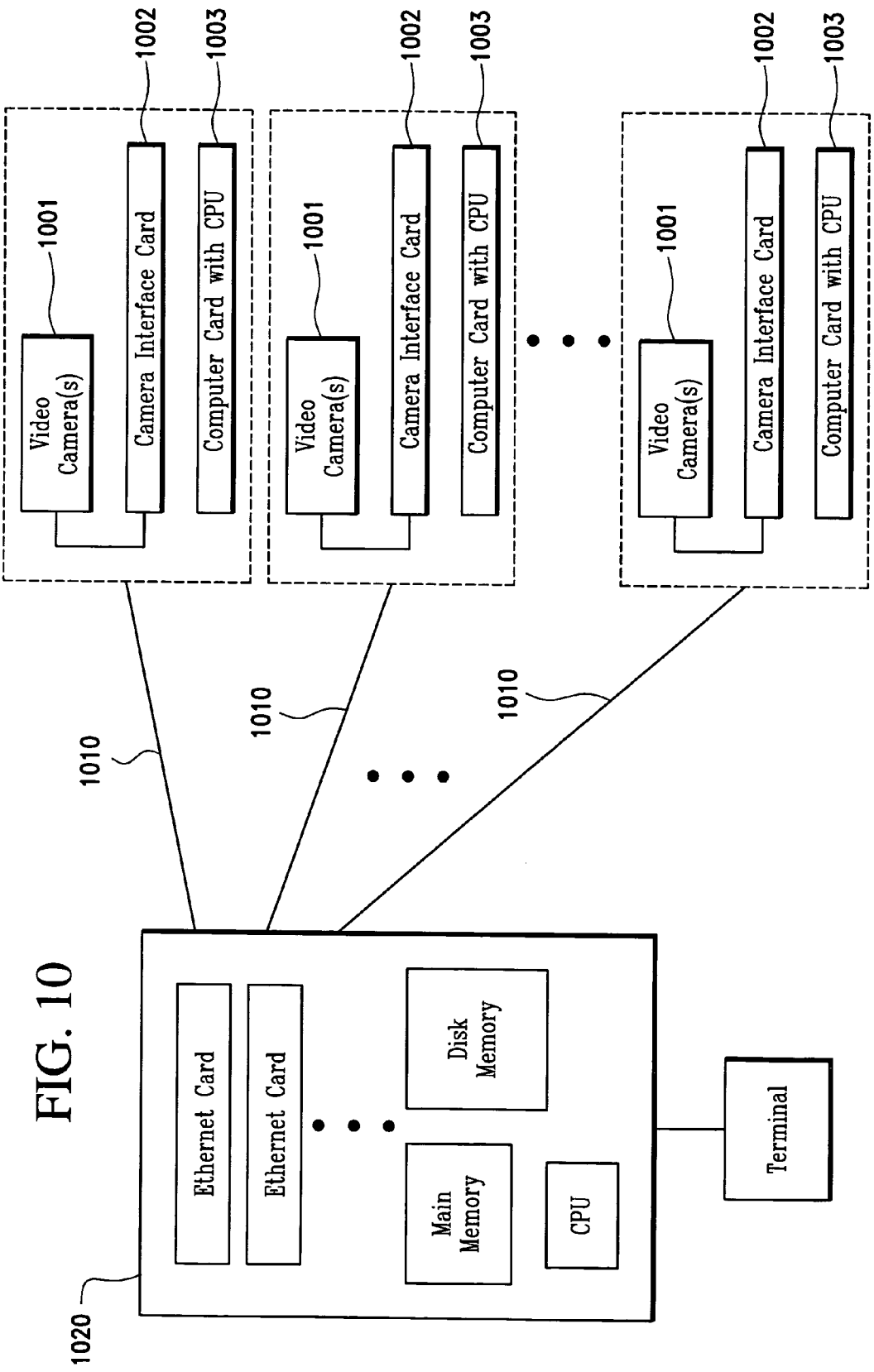
FIG. 10 is a block diagram of apparatus for a face recognition system with multiple sets of video camera(s) for monitoring various respective locations at once.

FIG. 10 shows hardware apparatus for a distributed system of cameras supporting face recognition applications where unknown subjects are being monitored at multiple remote locations, such as in a large building complex or even in a home with multiple rooms. Each reflective spectrum/thermal infrared imaging camera 1001 at a separate remote location is connected via a corresponding computer interface card 1002 to its own dedicated computer board 1003 such as a PC-104+ with PentiumIII. The task of detecting a face at each respective remote location, acquiring the reflective spectrum/thermal infrared imagery of the detected face and reducing to a face representation template is done by the dedicated computer at that remote location. The face representation template is then sent over a high-speed line 1010 (e.g., ethernet) to a main computer 1020 for comparison matching and implementation of the particular face recognition application required.

Although the invention has been described in terms of various preferred embodiments, it will be understood that numerous variations and modifications may be made without departing from the true spirit and scope thereof, as set forth in the following claims.

What is claimed is:

1. A method for performing face recognition, comprising:
   producing a first video image input produced from a scene sensed in the reflective domain from wavelengths in the range of 0.3 microns to 2.5 microns;
   producing a second video image input from said scene sensed in the thermal infrared domain;
   applying non-uniformity correction (NUC) to the second video image, thereby forming a corrected thermal infrared video image;
   creating a representation template for a face from a fused combination of the first video image obtained from the reflective domain and the corrected thermal infrared video image formed by applying NUC to the second video image obtained from the thermal infrared domain; and
   utilizing said face representation template for comparison and matching for face recognition.

2. The method in claim 1, wherein said method is used for face recognition system applications including access control, rank ordered identification and verification.

3. The method in claim 2, wherein the face representation template is a single or combination of templates of fused reflective domain and thermal infrared domain imagery.

4. The method of claim 2, further including automatically detecting faces in a scene to extract image region(s) in the reflective domain and thermal infrared domain from which to initiate creation of a face representation template.

5. The method of claim 4, further including geometrically normalizing face image regions in the reflective domain and thermal infrared domain.

6. The method of claim 5, further including assigning a set of sub-windows for geometrically normalized face image regions in the reflective domain and in the thermal infrared domain.

7. The method of claim 6, further including forming face representation templates from each sub-window.

8. The method of claim 7, further including combining face representation templates for each sub-window.

9. An apparatus for implementing face recognition comprising:
   at least one sensor configuration for simultaneously acquiring a reflective spectrum image in the wavelength range of 0.3 microns to 2.5 microns and a thermal infrared spectrum image and producing corresponding reflective spectrum and thermal infrared spectrum image signals;
   a computer system comprising a computational processor, a main memory and a storage memory:
   an interface card connected to said at least one sensor configuration to receive said reflective spectrum and thermal infrared spectrum signals and to send said signals to said main memory within said computer system, and
   wherein said computer system includes software for processing said input reflective spectrum and thermal infrared signals to create and store a face representation template in said storage memory and process said face representation template for comparison and face recognition.

10. The apparatus of claim 9, wherein said computer includes software using input reflective spectrum/thermal infrared spectrum imagery to detect faces in a scene.

11. The apparatus of claim 10, wherein said computer includes software which is able to compare and match face representation templates of unknown individuals, with those of known individuals.

12. The apparatus of claim 11, wherein said reflective spectrum image and thermal infrared spectrum image are spatially co-registered.

13. The apparatus of claim 12, wherein said reflective spectrum domain is the visible spectrum and said the thermal infrared spectrum is the longwave infrared (LWIR) spectrum.

* * * * *